Sept. 23, 1930.  F. SCHLAYER  1,776,396
AXIAL THRASHING MACHINE
Filed June 4, 1929  3 Sheets-Sheet 1
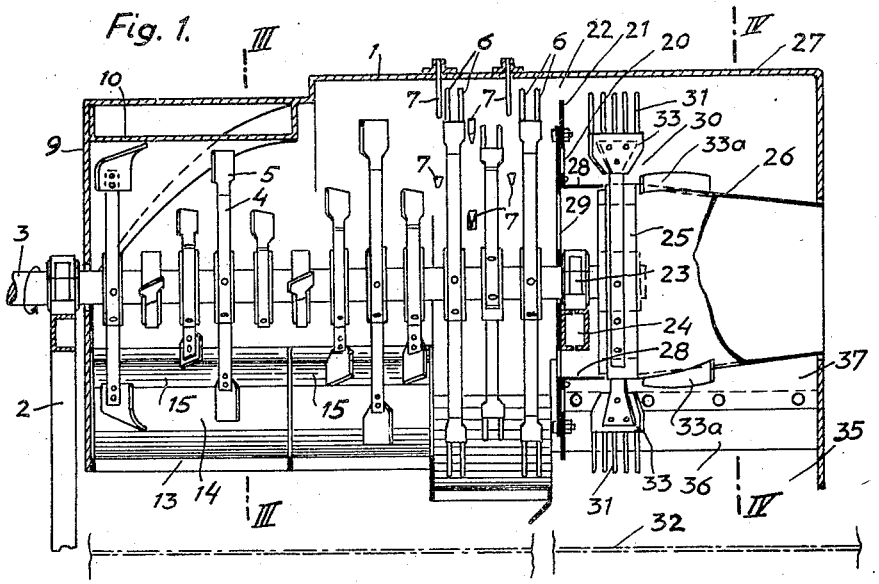
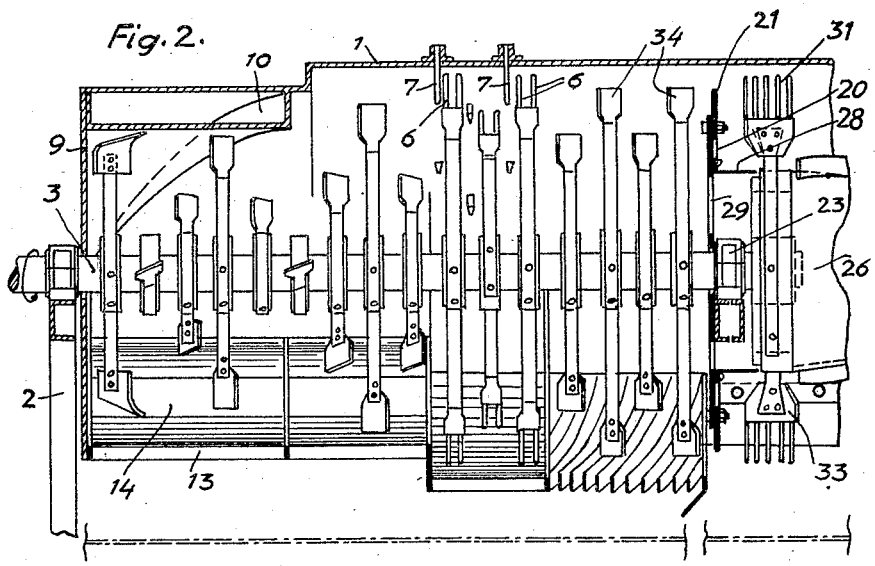
INVENTOR:
Felix Schlayer Sept. 23, 1930.　　　F. SCHLAYER　　　1,776,396
AXIAL THRASHING MACHINE
Filed June 4, 1929　　　3 Sheets-Sheet 2
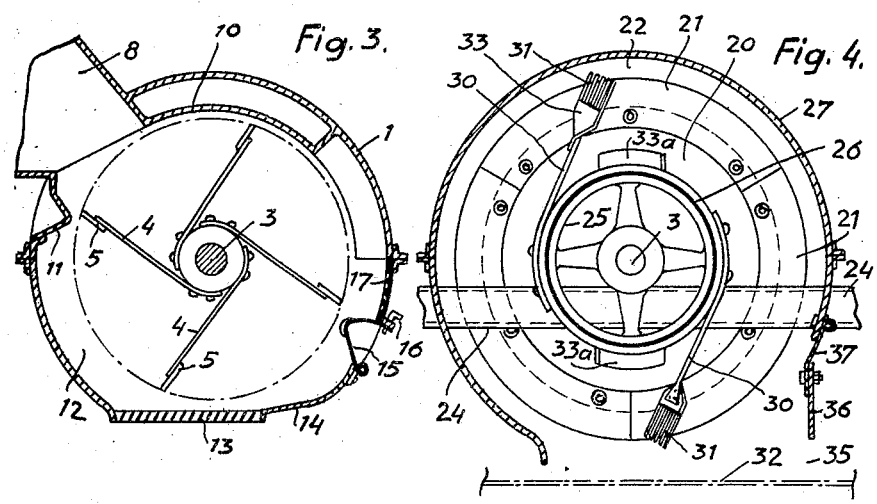
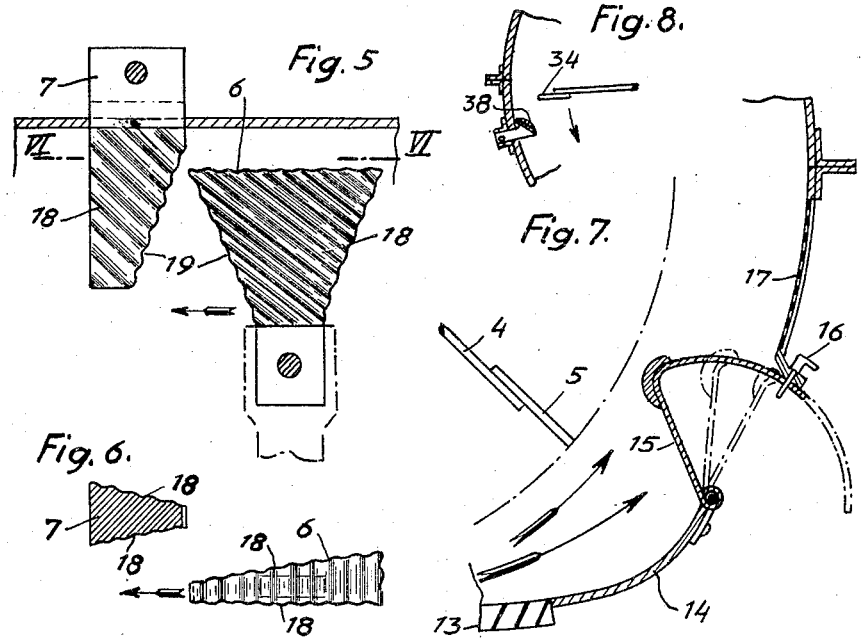
INVENTOR:
Felix Schlayer Sept. 23, 1930.  F. SCHLAYER  1,776,396
AXIAL THRASHING MACHINE
Filed June 4, 1929   3 Sheets-Sheet 3
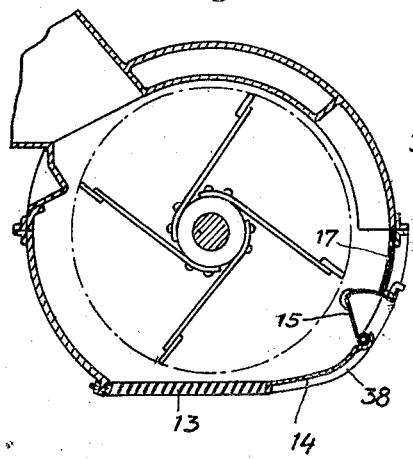
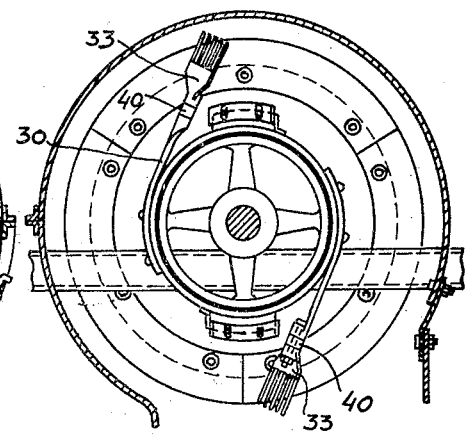
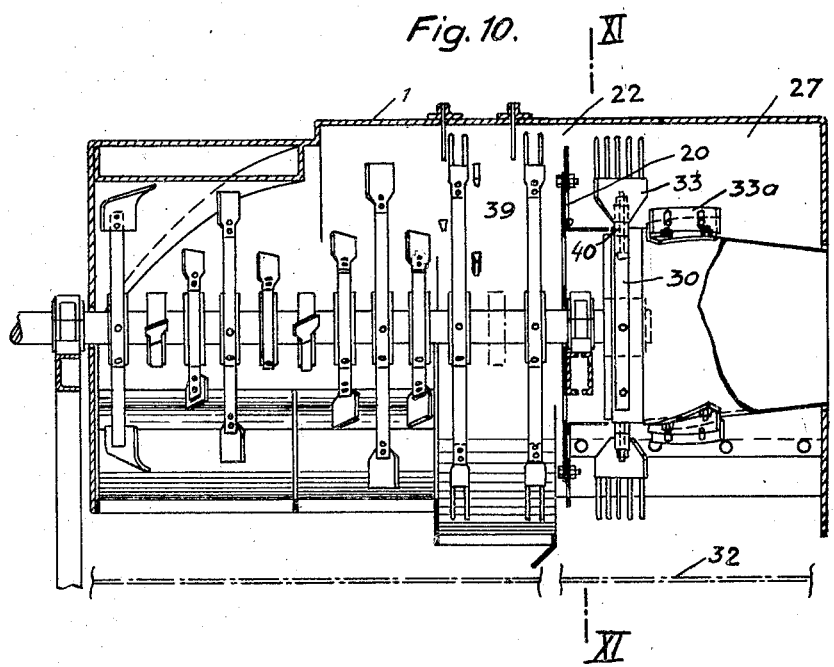
INVENTOR:
Felix Schlayer Patented Sept. 23, 1930

1,776,396

UNITED STATES PATENT OFFICE

FELIX SCHLAYER, OF MADRID, SPAIN

AXIAL THRASHING MACHINE

Application filed June 4, 1929, Serial No. 368,221, and in Austria June 6, 1928.

The axial thrashing machine of the Schlayer type has hitherto been known only in connection with the axial straw reducing machine, the grain to be treated being subjected on its entire path through the machine to a combined thrashing and reducing action and coming out at the discharge end in the form of chaff-like short straw which is chiefly used as fodder.

However, as it is customary in many regions to employ the straw obtained by thrashing as litter after chopping it before or after thrashing on special machines into lengths ranging approximately from 20 to 40 cm., it is the object of the present invention to provide a Schlayer axial thrashing machine adapted also to supply disintegrated longer straw that can be used as litter.

In order to attain this new object it is necessary to provide the machine with special equipment to replace the working members eliminated together with the reducing portion so that, though the length of the machine and the duration of treatment are shortened, thorough thrashing out is insured and a straw produced that is soft, opened up, adapted to absorb liquid manure, and generally suited to serve as litter.

The latter feature establishes a considerable superiority of the invention as compared with the machines mentioned having chopping devices and operating as long or broad thrashing outfits to produce litter, because in these machines the members serving for squeezing and softening the straw are either lacking entirely or cannot be attached in a simple manner while in the present invention they form a part of the machine.

The new equipment consists firstly in providing the machine drum with bulges having baffle surfaces or bodies to insure an increased thrashing effect especially for those ears which in case of very dry, brittle grain are removed prematurely from the blades. The baffle surfaces contain preferably grooved thrashing bars which can be adjusted to adapt the machine to the nature and condition of the grain. The bulge and baffle surface are provided, above all, in the inlet portion of the machine, but may also be arranged elsewhere to suit requirements.

To soften and open up the long straw, conical grooved bodies are employed in the machine part connecting with the inlet end for the coacting members and especially those that are in engagement. These bodies do not so much disintegrate the straw but split it up by exposing it to squeezing, pressing, rubbing and the like so as to render it particularly suitable for serving as litter.

The boundary of this axial thrashing machine furnishing litter is formed preferably by a fixed end wall behind which a shaft bearing is arranged on a bracket. To protect the latter against being covered up by long straw, the invention provides clearer forks behind it connected with the shaft and preferably adjusted to transport, which continually draw off the straw from the bracket and loosen it.

A further improvement consists in the employment of means adapted to produce additional wind in a hood opening below and being arranged above a straw sieve at the end of the machine. This especially radially flowing wind serves the purpose of removing rapidly the straw consisting of long blade parts from the hood and of distributing it equally on the sieve.

Moreover, the invention makes it possible to combine a thrashing machine producing litter with a straw reducing machine, the change to the former consisting in exchanging in the end reducing portion the reducing tools of the beaters for wide-faced caps which produce a wind strong enough to move the longer grain blades while the fixed members are either omitted entirely or replaced by special thrashing noses.

Several embodiments of the invention are illustrated by way of example in the accompanying drawings, in which Figure 1 is a vertical longitudinal medial section of an axial thrashing machine of the Schlayer type producing litter; Fig. 2, a vertical longitudinal section of an axial thrashing and straw reducing machine of the Schlayer type altered so as to produce litter; Figs. 3 and 4 represent sections on the lines III—III and IV—IV respectively of Fig. 1; Fig. 5 shows two coacting fingers on an enlarged scale; Fig. 6 is a section on the line VI—VI of Fig. 5; Fig. 7 is a section on an enlarged scale of the drum portion containing the bulge and secondary thrashing body; Fig. 8, a section of a thrashing bar adapted to be employed in the discharge part of the machine; Fig. 9, a section similar to Fig. 3 through a modification; Fig. 10, a vertical longitudinal medial section of a litter-producing thrashing machine with buffer space and adjustable wind vanes; and Fig. 11, a section on the line XI—XI of Fig. 10.

Referring to the drawings, the machine consists chiefly of a cylindrical drum 1 arranged in a frame 2 and provided with a shaft 3 which carries the beater arms 4 fitted on their ends with tools comprising in the inlet portion or the actual thrashing space plate-like bodies 5 and cooperating with the wall 1 of the drum. The connecting thrashing space contains also the beater plates 5 while in the preliminary reducing space specially shaped rotary fingers 6 are employed corresponding to similarly shaped fingers 7 rigidly secured to the thrashing drum. According to the Schlayer system, the free ends of the rotary working members 5, 6 and the members 1, 7 cooperating with them are positioned relative to one another so that the radial gap between them is constantly reduced from the inlet end of the machine towards the discharge end or ends in engagement.

The inlet portion contains the charging opening 8 provided with a wedge-like projection 10 extending approximately from the horizontal medial plane of the machine and the front wall 9 of the drum. Below the charging opening 8 a stepped nose 11 projects from the wall of the drum, and underneath the nose a tossing space 12 is arranged extending to a flattened sieve 13 in the bottom of the thrashing space boundary.

This sieve 13 approaches the circle of rotation of the beaters and extends as viewed in the direction of rotation of the beaters into a tangential and not perforated sheet metal wall 14 representing a sort of bulge and permitting a tangential flow of the material to be thrashed; at the end of the bulge is found a more or less curved baffle surface which leads back to the normal cylindrical thrashing space boundary. This surface, against which the material is tossed, is formed partly by a grooved member 15 adjustably arranged with respect to the inside of the drum and adapted to be fixed in various operating positions by the bolt 16 or the like. The baffle surface is arranged at such a distance below the horizontal medial plane of the machine drum that there is room enough between them to accommodate a sieve 17 of sufficient height.

According to requirements, the baffle surface may be provided also in the middle drum part and in the preliminary reducing space in machines as shown by Fig. 1 or, in machines as represented in Fig. 2, also in the principal reducing space.

The fingers 6 and 7 employed in the preliminary reducing space are of trapezoid cross section and provided on both flat sides with a preferably obliquely extending grooving 18, the grooving of the stationary fingers 6 having the same direction as that of the rotary fingers 7. The grooving is found also on the upper and lower surfaces 19 facing the material to be worked and on the front surface. For reasons of adjustability or changeability the fingers may also be of unsymmetrical cross section so that, for example, one of the side surfaces is arranged obliquely and the other, vertically.

The fingers are not of equal height, the stationary fingers 7 tapering towards the point while the rotary fingers 6 taper towards the base. This arrangement is advantageous in so far as the surfaces 19 facing the material to be worked are inclined relative to one another towards the thrashing space so that during the cooperation of these surfaces an acute angle is formed which opens towards the thrashing space and which favors the working of the grain and its conveyance towards the discharge end of the machine.

The rear boundary of the working space is formed by a stationary end disc 20 the detachable rim 21 of which consists of several parts and renders it possible by interchange to impart to the annular outlet gap 22 the width required for the passage of the straw. Behind the end disc 20 a shaft bearing 23 is provided on a carrier 24 crossing the outlet gap 22 at two places.

Behind the bearing 23, 24 the shaft 3 carries a flywheel 25 through the spokes of which air can flow coming from the rear end of the machine through an aspirating cylinder 26 secured to the flywheel, the said cylinder passing through a hood 27 arranged at the outlet of the machine for catching the straw. From the flywheel 25 the aspirated air passes through a connecting piece 28 rigidly connected with the disc 20 and packed relative to the flywheel and through the central apertures 29 of the end disc 20 into the machine.

The flywheel possesses tangentially arranged beaters 30 carrying the forks 31 which are positioned obliquely and serve the purpose of catching the material coming from the annular gap 22, of conveying it within the hood 27, of loosening and distributing it. They also remove straw held by the carrier 24.

For the radial conveyance of the straw and its distribution on the outlet sieve 32 below the hood 27 additional and especially radially flowing wind is produced in the hood by means of the blower vanes 33, 33ª specially provided for this purpose. The vanes 33 are secured to the arms 30 and carry the forks 31. The vanes 33ª are attached to the cylinder 26, both sets of vanes being adjusted to transport so as to influence mechanically the conveyance and distribution of the straw.

According to the invention, the machine can also be provided with a straw disintegrating or reducing portion to produce chopped fodder. On the other hand, if a machine is to produce litter, the reducing members are removed and the beater arms 3 provided with the plates 34. In the machines shown in Figs. 1 and 2 the height of the outlet opening 35 of the hood 27 above the sieve 32 is variable owing to the presence of the removable sheets 36, 37 on the wall of the hood.

Fig. 8 shows how the thrashing plates cooperate with a thrashing bar 38 preferably arranged at the machine end in the lower part of the machine half not shown in Fig. 2. This thrashing bar extends relatively far into the thrashing space and maintains preferably an oblique position relative to the direction of the rotating material to be worked.

The machine functions so that the grain entering through the opening 8 is caught by the rotary thrashing members 5 and thrashed chiefly on the path to the sieve 13 through which the grains drop. In the course of the subsequent rotary motion the material is tossed into the bulge 14 and against the baffle surface 15 whereby a strong thrashing action is produced. The grains released thereby drop partly through the sieve 17. During its further spiral movement the material to be thrashed is pushed by the projection 10 from the charging zone, worked still more thoroughly in the then narrowing gap between the beaters 5 and the machine wall 1, and tossed again against the after-treatment surface 15. In the preliminary reducing portion of the machine the blades are softened and split up and, after coming out of the drum space in the hood 27, are subjected to the action of the additional wind produced by the blower vanes 33, 33ª until they receive their final bolting on the sieve 32. The grains of all sieves 13, 17, 32 are preferably separately subjected to preparatory cleaning and then sifted again in a common machine.

The action of the machine according to Fig. 2 is practically the same, the only difference being that secondary thrashing takes place in the machine space otherwise serving as reducing portion.

According to the modification shown in Fig. 9 the part 14 comprises a flap hinged to the sieve surface 13 and adapted to be turned down. Moreover, the sieve 13, the flap 14, the after-treatment surface 15, and the sieve 17 form the self-contained unit 38 which can be attached separately.

As the gap 22 between the wall 1 of the drum and the end disc 20 permits only the passage of a certain quantity of straw, it is advisable, according to Fig. 10, to provide in the rear end of the machine a buffer space 39. This can be done quite simply by omitting one of the rows of beaters provided in regularly spaced relation, preferably the next to last one. This arrangement is possible also in machines according to Fig. 2.

To increase or reduce the effect of the additional wind produced in the hood 27 according to the nature of the material to be worked or to shorten or prolong the sieving of the litter blown away by this wind on the sieve 32, the wind vanes 33, 33ª are arranged adjustably, the vanes 33 being especially adjustable about the axis of their arms 30 to effect greater inclination. Simultaneously, means such as the separators 40 may be provided for radial adjustment. The vanes 33ª can be extended or shortened in radial direction. Furthermore, they are interchangeable and their lower edges have different curvatures so as to vary inclinations.

I claim:—

1. Axial thrashing machine comprising a drum having an inlet on one end and an outlet on the other end, a shaft in the said drum, beaters on the shaft rotating in the thrashing space limited by the drum, a sieve surface in the lower portion of the machine casing which approaches the circle of rotation of the beaters, a bulge in the drum wall connecting with the trailing edge of the sieve surface, the said bulge forming a tangential path for the material, at the end of the bulge baffle surface, the said baffle surface returning to the drum wall and adapted to remove the grains from the material.

2. A machine according to claim 1, in which the baffle surface is arranged adjustably towards the inside of the drum.

3. A machine according to claim 1, in which the baffle surface is guided back considerably below the horizontal medial plane of the machine to the normal thrashing space boundary.

4. A machine according to claim 1, in which the bulge and the baffle surface are provided at least on the larger part of the machine length.

5. A machine according to claim 1, in which in the actual thrashing space the baffle surfaces form the only rigidly arranged individual thrashing members with which the rotary beaters cooperate.

6. Axial thrashing machine of the type described having in its rear part rigidly arranged working members which mesh with rotary members, the said members being fingers of trapezoid cross section.

7. A machine according to claim 6, in which the opposite sides of two adjacent, cooperating, rigidly and rotatingly arranged fingers show an obliquely extending grooving.

8. A machine according to claim 6, in which the fingers are of unsymmetrical cross section, one lateral surface being arranged obliquely and the other, vertically.

9. A machine according to claim 6, in which the surfaces of the cooperating stationary and rotating fingers facing the material to be worked are arranged in inclined position to include during their cooperation an acute angle open towards the thrashing space.

10. Axial thrashing machine of the type described having stationary and rotary working fingers arranged on edge, the height of the stationary fingers diminishing from the base towards the point, the height of the rotary fingers increasing from the base towards the point.

11. Axial thrashing machine of the type described having on the rear end a catch hood open below, a movable straw sieve below the hood opening, and within the hood means for producing additional wind, the said wind serving for the radial conveyance of the straw from the hood and the distribution of the straw on the sieve.

12. A machine according to claim 1, wherein behind the beater rows on the machine shaft a clearer device is provided serving for the axial removal of the outcoming straw.

13. A machine according to claim 1, behind the beater rows being a beam for the machine shaft, the said beam passing through the thrashing space, and behind the bearing beam on the shaft a straw clearer to remove the straw from the beam.

14. Axial thrashing machine of the type described, behind the beater rows a disc with central air passage, the said disc having a smaller diameter than the drum to form a straw passage, behind the disc a shaft bearing, behind the shaft bearing an aspirating cylinder corresponding to the central disc opening, the said cylinder being coaxial with the shaft and connected therewith, and a straw hood at the machine end, the said cylinder passing through the said hood.

15. A machine according to claim 14, blower vanes being provided on the rotary aspirating body for producing additional wind.

16. In a machine according to claim 11 means for producing additional wind comprising blower vanes, the said vanes being adjustable.

17. A machine according to claim 14, including blower vanes provided on the rotary aspirating body, said blower vanes being adjustable.

18. Axial thrashing machine of the type described, the rotary beaters of the rear machine end showing plates as working members, the stationary members consisting of thrashing bars projecting considerably into the thrashing space.

19. Machine according to claim 11, wherein means are provided to vary the height of the outlet opening arranged above the sieve.

20. A machine according to claim 1 in which the bulge extends from the lower crest of the thrashing space boundary and is guided back with its after-treatment surface considerably below the horizontal medial plane of the machine to the thrashing space boundary and in which the portion of the machine wall communicating with the baffle surface and extending up to the horizontal medial plane is formed like a sieve.

21. A machine according to claim 6 in which the opposite sides of two adjacent cooperating rigidly and rotatingly arranged fingers are provided with an obliquely extending grooving, and at least one more front, upper or lower surface of the finger is provided with grooving.

22. A machine according to claim 6 in which the opposite sides of two adjacent cooperating rigidly and rotatingly arranged fingers are provided with an obliquely extending grooving, the grooving of the rotary finger extending in the same direction as that of the rotary finger concerned.

23. A machine according to claim 14, in which the disc is stationary, with an air conducting cylinder on the back of the disc, the said air conducting cylinder extending up to the rotary aspirating cylinder and forming a packing connection therewith.

24. A machine according to claim 14, in which straw clearers are provided on the rotary aspirating cylinder.

25. An axial thrashing machine of the type described in claim 14 wherein blower vanes are provided on the cylinder for producing additional draft, said vanes being adjustable about their radial axis.

26. Machine according to claim 14, in which straw clearers are provided on the rotary aspirating body, the said straw clearers being carried by arms, the arms being disposed tangentially relative to the aspirating body.

27. An axial thrashing machine of the type described, beaters, a disc behind the beater rows, said disc having central openings and being provided with a smaller diameter than the drum to form a straw outlet, the said disc being fitted with an interchangeable rim adapted to vary the width of gap of the straw outlet.

28. A machine according to claim 14, in which the aspirating cylinder is carried by a flywheel, the said flywheel having central air passages.

29. A machine according to claim 11, in which the means for producing wind are disposed obliquely and adapted to convey the straw mechanically also.

30. An axial thrashing machine of the type described, including a retaining disc at the end of the machine behind the beater rows, a buffer space in front of the retaining disc, the said buffer space being formed by spacing the beater rows here at a larger distance from one another than in the remaining portion of the machine.

FELIX SCHLAYER.